(12) United States Patent
Pati et al.

(10) Patent No.: US 11,263,644 B2
(45) Date of Patent: Mar. 1, 2022

(54) SYSTEMS AND METHODS FOR DETECTING UNAUTHORIZED OR SUSPICIOUS FINANCIAL ACTIVITY

(71) Applicant: Actimize LTD., Ra'anana (IL)

(72) Inventors: Debabrata Pati, Pune (IN); Pravin Dahiphale, Pune (IN); Ofir Itzhak Reichenberg, Cresskill, NJ (US)

(73) Assignee: ACTIMIZE LTD., Ra'anana (IL)

( * ) Notice: Subject to any disclaimer, the term of this patent is extended or adjusted under 35 U.S.C. 154(b) by 183 days.

(21) Appl. No.: 16/855,650

(22) Filed: Apr. 22, 2020

(65) Prior Publication Data

US 2021/0334822 A1 Oct. 28, 2021

(51) Int. Cl.

| | |
|---|---|
| *G06Q 30/00* | (2012.01) |
| *G06N 3/08* | (2006.01) |
| *G06Q 40/02* | (2012.01) |
| *H04L 29/06* | (2006.01) |
| *G06Q 40/08* | (2012.01) |
| *G06Q 50/26* | (2012.01) |
| *G06F 16/901* | (2019.01) |
| *G06Q 30/02* | (2012.01) |

(52) U.S. Cl.
CPC ..... *G06Q 30/0185* (2013.01); *G06F 16/9024* (2019.01); *G06N 3/08* (2013.01); *G06Q 30/0201* (2013.01); *G06Q 40/02* (2013.01); *G06Q 40/08* (2013.01); *G06Q 50/265* (2013.01); *H04L 63/302* (2013.01)

(58) Field of Classification Search
CPC .......... G06Q 30/0185; G06Q 30/0201; G06Q 40/02; G06Q 40/08; G06Q 50/265; G06F 16/9024; G06N 3/08; H04L 63/302
USPC ....................................................... 705/3–44
See application file for complete search history.

(56) References Cited

U.S. PATENT DOCUMENTS

| | | | |
|---|---|---|---|
| 7,698,398 B1 * | 4/2010 | Lai ........................ | G06Q 10/10 709/223 |
| 8,805,737 B1 * | 8/2014 | Chen ...................... | G06Q 40/02 705/38 |
| 9,294,497 B1 * | 3/2016 | Ben-Or ............... | H04L 63/1433 |
| 10,885,133 B1 * | 1/2021 | Maida, IV ............. | G06Q 40/00 |

(Continued)

OTHER PUBLICATIONS

Nuno C. Garcia, Social Network Analysis for Insurance Fraud Detection, ProQuest Id No. 28762481, Oct. 2015.*

(Continued)

*Primary Examiner* — Frantzy Poinvil
(74) *Attorney, Agent, or Firm* — Haynes and Boone LLP

(57) ABSTRACT

In a method for detecting unauthorized or suspicious financial activity, a graph convolutional network for financial crime prevention, a separate node is created for each entity: each account, each person, each address (e.g. email address), etc. Separate attributes are provided to aggregate transactions in which the node acts as a sender; transactions in which the node acts as a receiver; transactions using a specific channel (e.g. ATM); and transactions of a specific type (e.g. online money transfer). In some embodiments, the attributes exclude data on individual transactions to reduce the amount of data and hence provide more effective computer utilization. The approach is suitable for many applications, including anti-money laundering. Other features are also provided, as well as systems for such detection.

20 Claims, 11 Drawing Sheets

(56) References Cited

U.S. PATENT DOCUMENTS

| | | | | |
|---|---|---|---|---|
| 2006/0253579 | A1* | 11/2006 | Dixon | G06Q 40/00 709/225 |
| 2014/0258117 | A1* | 9/2014 | Holland | G06Q 20/10 705/42 |
| 2021/0042830 | A1* | 2/2021 | Burke | G06F 16/2379 |
| 2021/0209604 | A1* | 7/2021 | Wang | G06Q 20/40 |

OTHER PUBLICATIONS

Shaiq et al., Designing a relational model to identify relationships between suspicious customers in anti-money laundering (AML) using social network analysis (SN), Journal of Big Data (Year: 2021).*

David Savage, et al., "Detection of money laundering groups using supervised learning in networks", 11 pages, arXiv:1608.00708v1 [cs.SI], Aug. 2, 2016.

Thomas KIPF, "Graph Convolution Networks", 7 pages, https://tkipf.github.io/graph-convolutional-networks/, Sep. 30, 2016.

Thomas N. Kipf, et al., "Semi-Supervised Classification With Graph Convolutional Networks", 14 pages, Conference paper at ICLR 2017, arXiv:1609.02907v4 [cs.LG] Feb. 22, 2017.

Ahmed Hassan (Ph.D. Candidate), "Random Walks on Graphs Classification, Clustering, and Ranking", 10 pages, University of Michigan Ann Arbor, Computer Science and Engineering Dept., Nov. 10, 2016.

Jle Chen, et al., "FastGCN: Fast learning With Graph Convolutional Networks Via Importance Sampling", 15 pages, Conference paper at ICLR 2018, Jan. 30, 2018.

William L. Hamilton, et al., "Inductive Representation Learning on Large Graphs", 19 pages, 31$^{st}$ Conference paper at Neural Information Processing Systems 2017, Sep. 10, 2018.

Mark WEBER, et al., "Scalable Graph Learning for Anti-Money Laundering: A First Look", 7 pages, arXiv:1812.00076v1 [cs.SI] Nov. 30, 2018.

Lu Bai, et al., "Learning Aligned-Spatial Graph Convolutional Networks for Graph Classification", 18 pages, https://ecmlpkdd2019.org/downloads/paper/542.pdf, 2019.

Xiaodong Jiang, et al., "CensNet: Convolution with Edge-Node Switching in Graph Neural Networks", pp. 2656-2662, Proceedings of the Twenty-Eighth International Joint Conference on Artificial Intelligence (IJCAI-19), 2019.

Dominik Wagner; "Latent representations of transaction network graphs in continuous vector spaces as features for money laundering detection"; pp. 1-12; Gesellschaft für Informatik (Hrsg.): SKILL 2019, Lecture Notes in Informatics (LNI), Gesellschaft für Informatik, Bonn 2019.

Raghavendra CHALAPATHY, et al., "Deep Learning For Anomaly Detection: A Survey", 50 pages, arXiv:1901.03407v2 [cs.LG] Jan. 23, 2019.

Fang LV, et al., "Detecting Fraudulent Bank Account Based on Convolutional Neural Network with Heterogeneous Data", 11 pages, Hindawi, Mathematical Problems in Engineering, vol. 2019, Article ID 3759607, https://doi.org/10.1155/2019/3759607, Mar. 25, 2019.

Daniel Fleury, "A Rescue Mission: 3 Ways Deep Learning Could Combat Human Trafficking", 10 pages, https://towardsdatascience.com/a-rescue-mission-3-ways-deep-learning-could-combat-human-trafficking-85700eb62be5, Jul. 8, 2019.

Mark Weber, et al., "Anti-Money Laundering in Bitcoin: Experimenting with Graph Convolutional Networks for Financial Forensics", 7 pages, arXiv:1908.02591v1 [cs.SI] Jul. 31, 2019.

Marco Schreyer, et al., "Detection of Accounting Anomalies in the Latent Space using Adversarial Autoencoder Neural Networks", 11 pages, arXiv:1908.00734v1 [cs.LG], Aug. 2, 2019.

Zonghan Wu, et al., "A Comprehensive Survey on Graph Neural Networks", 22 pages, Journal of Latex Class Files, Aug. 2019, and arXiv:1901.00596v4 [cs.LG] Dec. 4, 2019.

\* cited by examiner

| ENTITY_KEY | TRX_QTY_Mean | TRX_SUM_Mean | Source_ALL_ALL_Sum | Dest_EFT_ALL_Sum | Label |
|---|---|---|---|---|---|
| 005f4324363fecf203e2df273da0d7c86ce6e91e2 6dea9282efe903202f6187f | 1.176471 | 3.37E+03 | 17 | 17 | TP |
| 00fca9d4afaee8798d4c6c5b75e4f284493c baf9169a5bda0bb7ea910f4 | 1.145707 | 1.53E+05 | 96 | 93 | TP |
| 0106166fe1375c066ce260c43dbc9766b51d2aa d1af5dccd78021cc8ee4a2396 | 1.8 | 2.13E+06 | 8 | 8 | Clean |
| 013d75efadd9111f413fd039057e652f56fe1ae 5f037ddd034738d6b953d7d8 | 1 | 1.69E+04 | 9 | 9 | Clean |
| 016d05895492bb2d7d9821f47eefd9de72da44 5de28c31d644dd b4583d5b123 | 1 | 9.14E+02 | 3 | 3 | Clean |

FIG. 7

| ENTITY_KEY | OPP_ENTITY_KEY | Total_TRX_QTY | Total_TRX_SUM |
|---|---|---|---|
| 0004f8c003f798532 1f38f1b517b4589b7d8ef2ac fd85ba16ea2debebf519be5 | ef1138e51979 9a63cf8cf9 0daa39ef9728be33fa 7ab3495fe1edb2b891861a690 | 13 | 28600 |
| 000b17a15e5227393 5b6610a03c28e46f9869aa7 03cff1e09eaa47ab685b28ed | ef1138e51979 9a63cf8cf9 0daa39ef9728be33fa 7ab3495fe1edb2b891861a690 | 12 | 245469 |
| 000d4f572e36c8f09d79eb5ea54fab8e45d9cbd7 ef03fe9b16734781 36 29653 | acf97e45552e87e39067bbd44f29623d13c2f d7da0448783fcaa6bc3d75210a | 12 | 477828.84 |
| 000ede289110cd527c6e98482434 5a39c8dbb06 af5d83ed7c280d7b881aeac21 | 330a3e6917b0fde36b3bf9738cf363427cdca 4913e8336bf5d886213d8f65c3 | 24 | 255496.08 |
| 000ede289110cd527c6e98482434 5a39c8dbb06 af5d83ed7c280d7b881aeac21 | 454b3377ec03273d1f4f5cab40cf62a7fdd24e e9404931dc847c0380bec0dee10 | 12 | 1780.56 |

FIG. 8

| Entity | 0 | 1 | 2 | 3 | 4 |
|---|---|---|---|---|---|
| 005f4324363fecf203e2df273da0d7c86ce6e91e26dea9282efe903202f6187f | 1.10E+06 | 0 | 4.62E+06 | 0.00E+00 | 4.11E+06 |
| 00fca9d4afaee8798c3f89d4c6c5b75e4f284493cbaf9169a5bda0bb7ea910f4 | 2.33E+06 | 0 | 6.85E+06 | 0.00E+00 | 6.25E+06 |
| 0106166fe1375c066ce260c43dbc9766b51d2aad1af5dccd78021cc8ee4a2396 | 1.25E+07 | 0 | 4.34E+07 | 0.00E+00 | 3.67E+07 |
| 013d75efadd9111ff413fd039057e65f2f56fe1ae5f037dd034738d6b953d7d8 | 8.68E+04 | 0 | 2.85E+05 | 0.00E+00 | 2.50E+05 |
| 016d0589f5492bb2d7d98214f7eefd9de72da445de28c31d644db4583d55b123 | 2.68E+06 | 0 | 1.05E+07 | 0.00E+00 | 9.10E+06 |

FIG. 10

| Entity | Risk Score | Normalized Risk Score |
|---|---|---|
| 616b227bd5de6a9e39901543e32ae12a979b54544d91692c4d1a57796091fa1d | 0.515921 | 0.851123 |
| 959875cb003032fd6889add8c3d3aa7a702529 28d5fb794579d4e3696c03ebd7 | 0.528746 | 0.872280 |
| f981f2666f76991bcc2de98ff5fd49761a4c6dba0b5e06b1bbfe1cb3b2666371 | 0.537014 | 0.885921 |
| eeeed70cec6218c8fddc52b443389d8964bf9f624a7b31f328130ae77c45b63e | 0.606164 | 1.000000 |
| e4afadc9e598eb2d411a5e27f9e15b78cbe292da8128f1bdd2d92da02cffc4b2 | 2.119427 | 3.496482 |

FIG. 11

SYSTEMS AND METHODS FOR DETECTING UNAUTHORIZED OR SUSPICIOUS FINANCIAL ACTIVITY

FIELD OF THE INVENTION

The presented disclosure relates to computer technology, and more particularly to computerized systems and methods for detecting unauthorized or suspicious financial activity, e.g. money laundering, terrorist financing, human trafficking, stealing via an unauthorized money transfer from a possibly legitimate account, and the like.

BACKGROUND OF THE DISCLOSURE

Financial institutions—including banks, brokerage firms and insurance companies—have legal and business pressures to fight money laundering and other illegal activity. For example, financial institutions are required by law to monitor and report suspicious activities that may relate to money laundering and terrorist financing. The pertinent laws presently include the Bank Secrecy Act and the USA PATRIOT Act in the United States, the Third EU Directive in Europe, Articles on the Criminalization of Money Laundering in Japan, and others. As such, anti-money laundering (AML) compliance officers must create and maintain an effective transaction monitoring program to keep up with evolving regulations and control their AML program costs. Missteps could result in fines and reputational damage.

Fraudulent transactions, such as unauthorized withdrawals or transfers, may lead to large financial losses and lead to reputational losses.

Suspicious activities, patterns and transactions may have to be reported to authorities in accordance with corporate rules, local laws and/or national and international regulations. In some cases, these reports must be sent within specific timeframes, e.g. 48 hours.

Financial institutions use computers to store financial data on financial transactions as well as perform some transactions such as Electronic Fund Transfers (EFT), credit card transactions, and others. The computers can be used to identify unusual transactions and activity patterns, and detect the activities that are suspicious with regard to potential money laundering or terrorist financing or other illegal purposes.

In view of large amounts of data that need to be processed to detect suspicious activity, and the short deadlines dictated by law or business necessity, improved computer techniques are desired to stop financial crime.

SUMMARY

This section summarizes some features of the invention.

Some embodiments of the present disclosure use machine learning techniques based on Artificial Neural Networks (ANN) to detect suspicious activity and identify the pertinent accounts, people, companies, devices (e.g. computers, phones, Network Interface Cards, etc.), addresses, and/or other entities. Further, some embodiments calculate a risk score that a given entity is engaged in an unauthorized activity.

As is well known, machine learning (ML) techniques may or may not provide reliable results for any particular problem depending on the type of the Artificial Neural Network (ANN) and on data preparation, i.e. the kind of input data provided to the ANN. Further, machine learning techniques can be slow if the ANN algorithms are complex and the amount of data is large. In financial crime prevention, fast detection of suspicious activity can be critical to stop illegal flow of money or other valuables. Speed can also be important for retraining the machine to take account of changing legal, political, and business landscapes. But high processing speed and obtaining reliable results are conflicting goals because high reliability may require more detailed data and more complex, and hence slower, processing.

The inventors have discovered that both relatively high speed and high reliability can often be obtained using Graph Convolutional Neural Networks (GCN, sometimes also called GCNN or CGN) if the financial input data are suitably prepared. In this technique, financial data are represented as a graph. In a conventional graph representation for GCN, some information is associated with graph nodes (vertices), while other information is associated with graph edges. Selecting the kind of information to associate with a node or an edge is an important decision with regard to GCN reliability and speed. According to some embodiments of the disclosure, nodes are used to represent entities, and edges represent transactions or other relationships between the entities. Further, even related information on an entity can be represented by different nodes. For example, in some embodiments, an account entity is represented by one node; the account's owner is represented by a different node (rather than being an attribute of the account node); and the ownership relationship is represented by an edge between the two nodes. A family or business relationship between parties can also be represented by an edge. Thus, some embodiments use separate nodes to represent accounts, other nodes to represent parties, and optionally still other nodes to represent addresses, devices, etc. An address can be a complete street address, or a partial address (e.g. a country name and/or a city name and/or some other address portion). An address can also be an IP address, an email address, a layer-2 network address, or some other address recognized in computer networks. Such representation is believed to improve GCN reliability for many GCN types according to the present disclosure.

In some embodiments, information can be duplicated in different node types. For example, an account owner's name can be provided both in the owner's node and the account's node. In other embodiments, information is not duplicated: the account owner, the associated device, etc. are identified and described only in the respective nodes.

Further, in some embodiments, the financial data are aggregated before being provided to the GCN. Aggregation is performed to reduce the amount of data handled by the GCN and thus to increase the processing speed while reducing memory requirements. Generally, aggregation results in loss of information, and may therefore reduce reliability of the results. Aggregation should be performed to discard unimportant information while preserving essential information for reliable detection of suspicious entities. In some aggregation embodiments according to the present disclosure, the monetary amounts on individual transactions performed in a particular period of time are aggregated into averages and/or medians and/or maxima and/or minima and/or some other aggregated values. Further, for a given entity (e.g. account), separate aggregation is performed for transactions in which the entity is a transaction source, and separate aggregation is performed for transactions in which the entity is a destination. Also, separate aggregation may be performed for each transaction channel (e.g. online banking, ATM, etc.) and/or each transaction type (e.g. online money transfer) involving the entity. Such aggregation techniques preserve essential information to provide more reliable results.

The invention is not limited to the features or advantages described above. Also, some embodiments use one or more but not all of the techniques described above. For example, in some embodiments, the nodes and entities are defined as described above, but the aggregation is not performed per source or destination. In other embodiments, the aggregation is performed as described above, but the nodes are defined in a simpler manner, e.g. each account corresponds to a separate node, but the account owners and other account information are not associated with separate nodes but are stored as attributes of the account node. Other embodiments and variations are within the scope of the invention, as described by the present disclosure.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. In the figures, elements having the same designations have the same or similar functions.

FIGS. 7, 8, 9, 10, 11, 12, 13 illustrate results obtained in some embodiments in detecting suspicious financial activity.

DETAILED DESCRIPTION OF SOME EMBODIMENTS

The invention is not limited to the specific or preferred embodiments discussed in this section, but is defined by the disclosure as a whole (including the drawings) and as presently recited in the appended claims. Various mechanical, compositional, structural, and operational changes may be made without departing from the scope of this description and the claims. In some instances, well known structures or techniques have not been shown or described in detail, as these are known to those of ordinary skill in the art.

Figure 1:
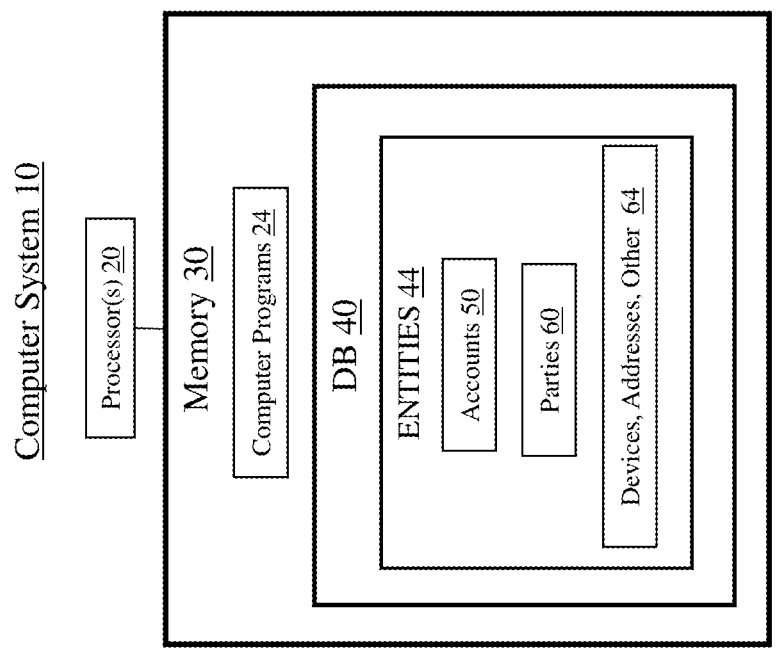
FIG. 1 illustrates a computer system suitable for identifying suspicious financial activities and entities according to some embodiments of the present invention.

FIG. 1 shows a financial institution's computer system 10 (possibly a distributed system) including one or more computer processors 20 executing computer programs 24 stored in memory 30. Memory 30 also stores a database 40 with information on entities 44 including accounts 50; parties 60 such as individuals, companies, and other types of groups, organizations or enterprises; and other entities 64 (addresses, devices, etc.).

In one approach according to the present disclosure, preventing financial crime involves identifying and alerting on risky entities 44, i.e. on entities that are more likely to be involved in unauthorized financial activity. That is done by identifying the entities that behave suspiciously or anomalously, as well as verifying the entities that behave in an expected manner and are therefore less likely to be a risky entity. Understanding the pattern of relationships for an account or a party or other entity with other entities provides new insights into the risk associated with entities and greatly enhances the accuracy of financial crime detection analytical models.

Figure 2:
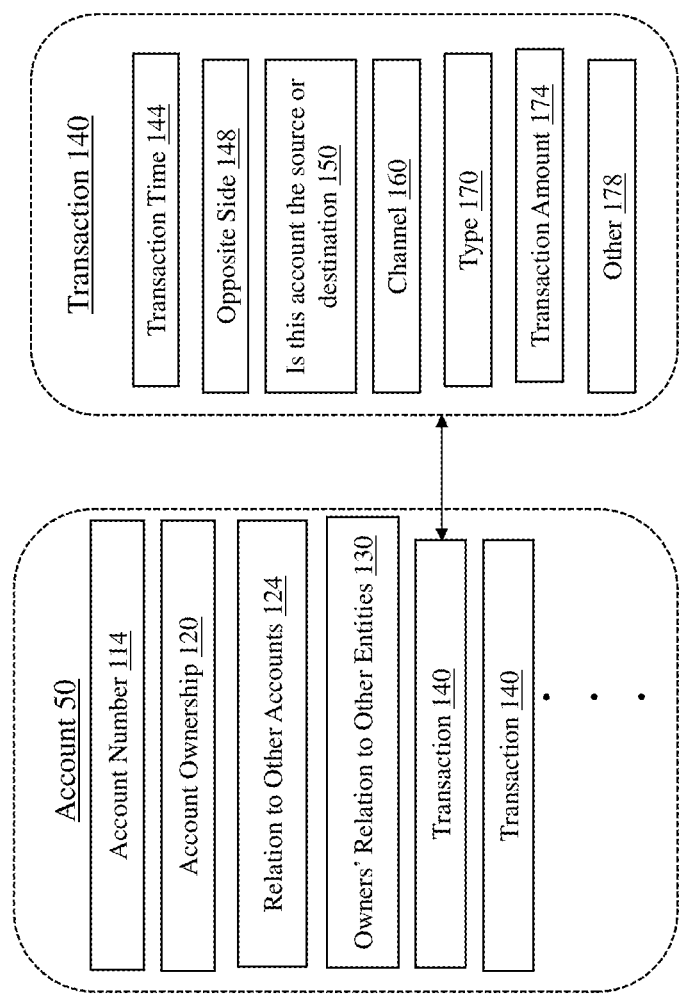
FIGS. 2, 3 illustrate financial data used by a computer system in some embodiments of the present invention.

In some embodiments, for each account 50, DB 40 stores data shown in FIG. 2. In particular, each account 50 is identified by some account ID (account number) 114. Further, account ownership data 120 specify the account owners (e.g. parties 60 or groups of parties), and the owners' addresses. Data 124 describe related accounts, e.g. accounts owned by the same owners. Data 130 describe the owners' relation to other entities, including family or other personal relationship, business relationships, or some other kind. For each transaction involving this account, transaction data 140 may describe the transaction as shown. In particular, data 144 specifies the transaction time. Opposite side data 148 specifies the opposite side, e.g. other account(s) 50 and/or parties 60. Source/Destination flag 150 specifies whether the account is the source or the destination in the transaction. Channel 160 indicates the technical infrastructure, e.g. Online banking, Phone banking, Check, etc. Type 170 indicates the type of activity, e.g. "login activity", "information update", "online monetary transfer", "online banking", etc. The Type 170 information may overlap with Channel 160 information. Some types of activities are performed only in specific channels. But a channel may allow multiple transaction types depending on the kind of channel.

"Other" data 178 may include other information, possibly dependent on the transaction type or channel. For example, for phone banking or online banking, other data 178 may include the device IDs (phone numbers, computer IDs, Network Interface Card IDs, etc.) involved in the transaction.

Figure 3:
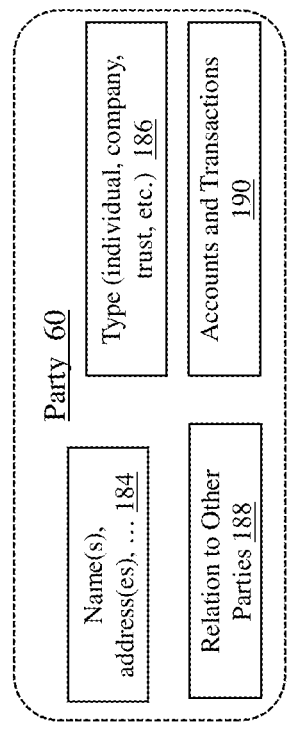

For each party 60 (FIG. 3), computer system 10 may store pertinent information such as: party name(s), address(es), phone numbers, and possibly other identifying information (184). Computer system 110 also may store the party type 186 (individual, corporation, or other type of group or organization); relation to other parties 188 (this can be family or other personal relationship, business relationship (e.g. corporate subsidiary or parent, etc.)); and accounts and transactions 190, e.g. as pointers to each account 50 (including the data structure of each account) and transaction data structures 140 of FIG. 2. (The invention is not limited to particular data organization, and whether the data are stored as pointers or as actual values or in any other way.) In particular, account and transaction item 190 may identify the accounts owned by the party and/or the transactions involving the party.

Figure 4:
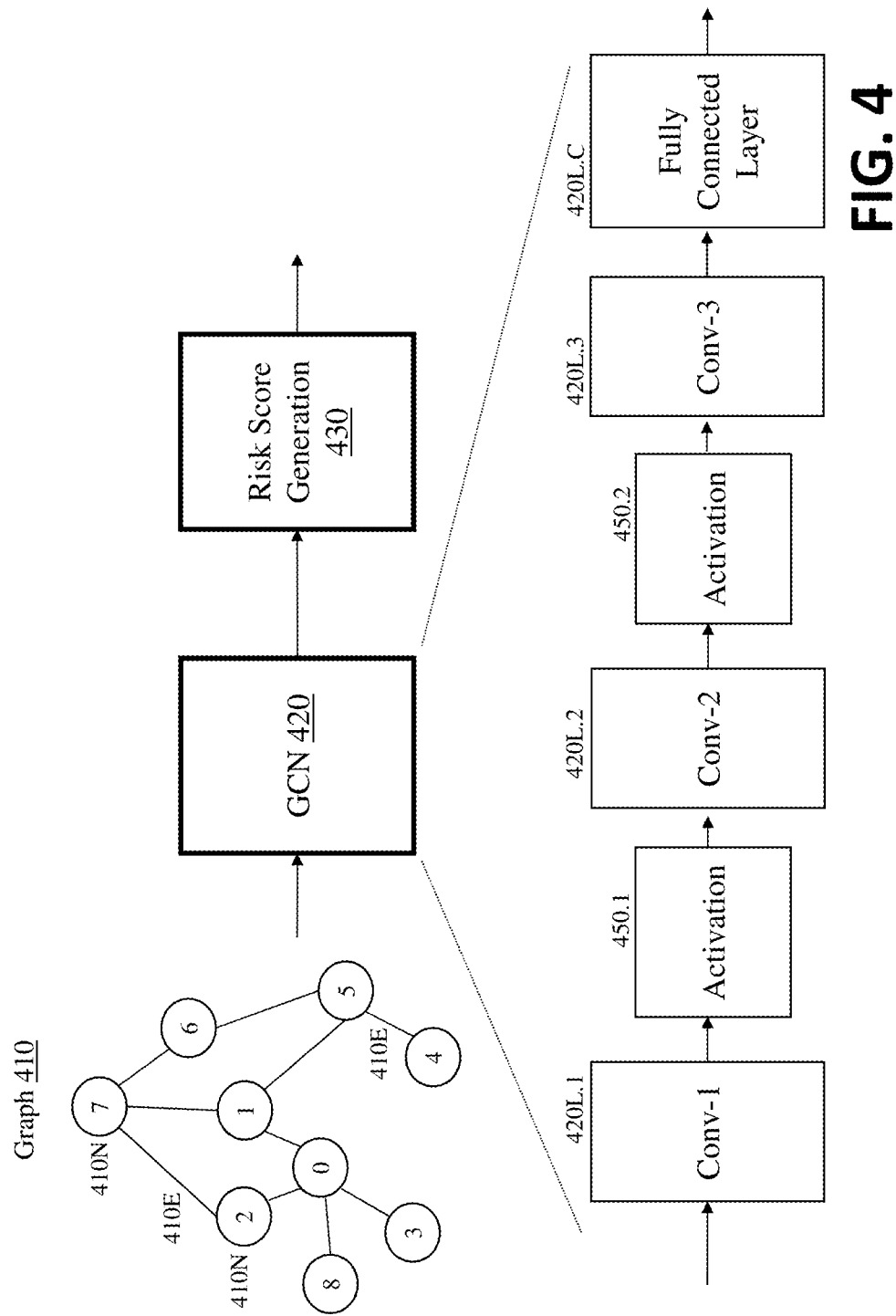
FIGS. 4, 5, 6 illustrate computer processes used to detect suspicious financial activity.

FIG. 4 illustrates GCN data processing according to some embodiments of the present disclosure. The financial data are represented as a graph 410, having nodes 410N (labeled as 0 to 8 in FIG. 4); and having edges 410E interconnecting the nodes. Each node 410N and each edge 410E are associated with attributes. Each node 410N represents an entity. In some embodiments, each node is associated with an attribute vector which has the same attribute fields for different entities except that some attribute values may be irrelevant for a given entity and may be set to null. For example, the "account number" attribute (114 in FIG. 2) may be meaningful only for the nodes representing the accounts 50, and may be null for the nodes representing the parties 60. In some embodiments, the attribute vector includes the coordinates with the following information (the "No." column is for ease of reference, and is not necessarily part of the attributes):

TABLE 1

NODE ATTRIBUTES

| No. | Attributes |
|---|---|
| 1 | Node type (account, or party, etc.) |
| 2 | Account info (114 to 130 in FIG. 2); provided for account nodes |
| 3 | For an account node, aggregated transaction info including separate coordinates for the average, median, maximum, minimum, and number of transactions for a given period of time, e.g. one month. In addition, a breakdown can be provided, with a separate attribute for the average, median, maximum, minimum, and number of transactions, for each of the following categories:<br>3A. Account is the source<br>3B. Account is the destination<br>3C. Per channel<br>3D. Per transaction type<br>3E. Other (e.g. per channel with the account as source; per channel with the account as destination; per type with the account as source; per type with the account as destination; per any combination of channel, type, and source/destination parameters, etc.) |
| 4 | For a party node, party info (184 and 186 in FIG. 3) |

These attributes are exemplary and not limiting. Some of the attributes can be omitted, and/or others can be provided.

Each edge 410E represents a relationship between the entities (nodes) interconnected by the edge. In some embodiments, at least some of the edge attributes are defined based on transactional activity occurring between the corresponding two nodes over time, e.g. a month (see for example item 3 in Table 2 below). Taking into account the transactional relationship over a period of time often provides more valuable input than just a predefined relationship.

An edge 410E may be directed or undirected. In some embodiments, each edge is associated with an attribute vector which has the same attribute fields for different relationships except that some attribute values are irrelevant for a relationship and may be set to null. For example, in a family relationship edge, the transaction amounts can be null if there are no transactions between the family members. In some embodiments, the attribute vector includes the coordinates with the following information (the "No." column is for ease of reference, and is not necessarily part of the attributes):

TABLE 2

EDGE ATTRIBUTES

| No. | Attributes |
|---|---|
| 1 | Edge type (transaction, or family or other personal relationship, or business relationship, or ownership (for an edge connecting a party to a business or account, etc.) |
| 2 | Relationship info (for business or family or personal relation, and possibly for others) |
| 3 | Aggregated transaction info including separate coordinates for the average, median, maximum, minimum, and number of transactions for a given period of time, e.g. one month. In addition, a breakdown can be provided, with a separate attribute for the average, median, maximum, minimum, and number of transactions, for each of the following categories:<br>3A. Per channel<br>3B. Per transaction type<br>3C. Other (e.g. per any combination of channel and type parameters, etc.) |

These attributes are exemplary and not limiting. Some of the attributes can be omitted, and/or others can be provided.

The graph structure 410, including the attributes, is provided to GCN 420. GCNs and other ANNs are described, for example, in the following publications incorporated herein by reference:

Zonghan Wu et al., "A Comprehensive Survey on Graph Neural Networks", JOURNAL OF LATEX CLASS FILES, AUGUST 2019, and arXiv:1901.00596v4 [cs.LG] 4 Dec. 2019.

Xiaodong Jiang, et al., "CensNet: Convolution with Edge-Node Switching in Graph Neural Networks", Proceedings of the Twenty-Eighth International Joint Conference on Artificial Intelligence (IJCAI-19).

Thomas N. Kipf et al., "SEMI-SUPERVISED CLASSIFICATION WITH GRAPH CONVOLUTIONAL NETWORKS", Conference paper at ICLR 2017, arXiv:1609.02907v4 [cs.LG] 22 Feb. 2017.

Mark Weber et al., "Scalable Graph Learning for Anti-Money Laundering: A First Look", arXiv:1812.00076v1 [cs.SI] 30 Nov. 2018.

Raghavendra Chalapathy et al., "DEEP LEARNING FOR ANOMALY DETECTION: A SURVEY", arXiv:1901.03407v2 [cs.LG] 23 Jan. 2019.

Marco Schreyer et al., "Detection of Accounting Anomalies in the Latent Space using Adversarial Autoencoder Neural Networks", arXiv:1908.00734v1 [cs.LG] 2 Aug. 2019.

David Savage et al., "Detection of money laundering groups using supervised learning in networks", arXiv:1608.00708v1 [cs.SI] 2 Aug. 2016.

Daniel Fleury, "A Rescue Mission: 3 Ways Deep Learning Could Combat Human Trafficking", http://towardsdatascience.com/a-rescue-mission-3-ways-deep-learning-could-combat-human-trafficking-85700eb62be5, Jul. 8, 2019.

Mark Weber et al., "Anti-Money Laundering in Bitcoin: Experimenting with Graph Convolutional Networks for Financial Forensics", arXiv:1908.02591v1 [cs.SI] 31 Jul. 2019.

Fang Lv et al., "Detecting Fraudulent Bank Account Based on Convolutional Neural Network with Heterogeneous Data", Hindawi, Mathematical Problems in Engineering, Volume 2019, Article ID 3759607, 11 pages, http://doi.ord/10.1155/2019/3759607, 25 Mar. 2019.

Thomas Kipf, "GRAPH CONVOLUTION NETWORKS", https://tkipft.github.io/graph-convolutional-networks/, 30 Sep. 2016.

Dominik Wagner, "Latent representations of transaction network graphs in continuous vector spaces as features for money laundering detection", Gesellschaft für Informatik (Hrsg.): SKILL 2019, Lecture Notes in Informatics (LNI), Gesellschaft für Informatik, Bonn 2019, pp. 1-12.

Lu Bai et al., "Learning Aligned-Spatial Graph Convolutional Networks for Graph Classification", https://ecmlpkdd2019.org/downloads/paper/542.pdf, 2019.

GCN 420 can be implemented as one of computer programs 24 (FIG. 1). GCN 420 includes one or more convolution layers 420L (three layers 420L.1, 420L.2, 420L.3 in the example of FIG. 4), separated by activation blocks 450 (450.1, 450.2). Non-convolutional layers can be provided at the input and/or output of each convolutional layer. For example, a pooling layer can be used at the output of a convolutional layer to coarsen the graph, i.e. combine multiple nodes 410N into a single node. Also, a readout layer (or a fully connected layer) 420L.C can be used as the final layer to classify the nodes. See for example "A Comprehensive Survey on Graph Neural Networks", cited above. In FIG. 4, the last layer 420L.C is a fully connected layer, classifying each node 410N as "suspicious" or "not suspicious" ("clean").

A convolutional layer 420L and the following activation block 450 replace each node's attribute value (Table 1) by a value computed as a function of the corresponding attribute values of neighbor nodes. For example, for the graph 410 of FIG. 4, suppose that node 0 and its adjacent nodes 1, 2, 8, 3 represent accounts. (If a neighbor node, say node 3, is a non-account node, the non-account node can be omitted from the convolution operation performed on the account node 0.) Each of these nodes 0, 1, 2, 8, 3 has an attribute value representing the average of the transaction amounts with the node being the source (Table 1, item 3A). Convolutional layer 420L.1 and activation block 450.1 replace this attribute value for node 0 with a value of some function $f$ (typically a non-linear function, e.g. ReLU or softmax or some other type) on the attribute values for nodes 0, 1, 2, 8, 3. The function $f$ is defined using unknown parameters (weights) determined in the training process from the training data. For example, in some embodiments, a convolutional layer 420L calculates a weighted average of the attributes. The following activation block 450 applies a non-linear function (e.g. ReLU) to the weighted average.

Different functions $f$ (e.g. different weights or function types) can be defined for different nodes and different attributes in the same convolutional layer and/or activation block, and can vary between different layers and/or activation blocks.

In the example above, the nodes 1, 2, 8, 3 form a neighborhood of order 1 for node 0, because they are just one link (one edge) away from node 0. A convolutional layer may operate on higher-order neighborhoods. For example, for node 0, the order 2 neighborhood includes all the nodes except nodes 4 and 6 (these nodes are 3 links away from node 0). The neighborhood of order 3 includes all the nodes. Each convolutional layer 420L can be associated with an order, and different layers 420L may have different orders.

Similar operations are performed for edge attributes. For example, an edge attribute value for the edge (0,1), i.e. the edge interconnecting the nodes 0 and 1, is replaced by a non-linear function of the corresponding attribute values for the edges connected to nodes 0 and 1, i.e. the edges (0,1), (0,2), (0,8), (0,3), (1,7), (1,5). (The function weights are determined in the training process.) This is the first-order convolution. Higher order convolution can also be used, when an edge's neighborhood includes edges that are more than 1 node away from the current edge.

Other types of node and edge processing can also be used. See for example the aforementioned articles "A Comprehensive Survey on Graph Neural Networks" and "CensNet: Convolution with Edge-Node Switching in Graph Neural Networks".

Both spectral and spatial convolutional layers can be used in the same GCN.

GCN module 420 outputs the node and edge embeddings, i.e. nodes and edges with their final attribute values processed as discussed above, and the classification of each node as suspicious or non-suspicious. In some embodiments, the embeddings are generated by convolutional layer 430L.3, and the classifications by connected layer 430L.C.

Risk score computation module 430 receives the output embeddings and classifications from GCN 420, and generates the risk score for each node (each entity). In some embodiments, risk score module 430 is an autoencoder ANN.

Further description of some embodiments is as follows.

As noted above, in some embodiments, the entities and their relationships are stored as nodes 410N and edges 410E of a graph. Entities can be people or businesses and relationships refer to both financial activity and ownership. The entities are depicted as nodes 410N whereas relationship among them can be termed as links or edges 410E in this complex financial relationship structure of monetary movements. The nodes and edges can then be directly translated to a neural network as a Graph Convolutional Network (GCN) 420. Past alerts and red flags on each entity are then used with a Node Embedding based Auto-Encoder (430) to generate an anomaly/risk score for each node 410N based on past node behavior and outcomes of nodes. This score can advantageously be used as a predictive risk score for the node. As a result, the risk score for the corresponding entity can be provided based on the amount and nature of the entities' relationships.

The risk computation for each entity does not necessarily use conventional approaches based on explicitly calculated "network risk". In such conventional approaches, related entities are grouped together to form a community or cluster, and then an algorithm is used to provide a risk score for each group.

In contrast, in some embodiments, the calculated risk of each entity is a function of the amount and nature of the entities' connections, possibly at multiple depth levels. The deeper one looks (i.e. the more convolutional layers 420L are used), the more accurate pattern analysis of an entity becomes, resulting in better risk calculation.

Thus, some embodiments provide advantageous approaches to the problem of efficiently and accurately calculating risk. Correctly modeling the risk based on the relationships requires factoring in a very large number of attributes among different entities working as nodes in a graph structure, with relationships represented as links 410E. Existing or traditional machine learning approaches rely on user-defined heuristics to extract features (attribute values) encoding structural information about a graph. Such conventional approach requires a huge amount of calculations with systems such as graph database to store complex graph data structures and tends to returns low quality results with respect to data and is therefore not efficient for risk calculations considering entity relationships. In some embodiments, when the innovative combination of mapping the relationship to a convolutional graph and using neural network to train the model results is used, it helps in identifying deeper risk relationships of entities with effective resource utilization in financial risk area.

Some embodiments use financial data stored in existing, conventional financial computer systems, and focus on how to directly calculate the risk for every entity. This calculation is based on graph convolutional neural networks—this approach allows us to directly implement a neural network on the entities and their relations.

By directly training a graph neural network model on the entities and their relationship properties over a time period, a GCN model can be built with fewer layers and increased performance compared to conventional neural network approaches. Calculating risk directly on each entity is a very significant improvement over existing approaches of calculating a score per "cycle" in the graph and applying it to all participating entities in financial risk domain. The improvement is in both scalability and the resulting accuracy of risk profiles.

Some embodiments can be used by any organizations that deals with entities—persons, companies, accounts—that maintain relationships—shared activities or ownership, and must rate their risk. That includes all financial services companies and software vendors—banks, financial services companies, retailers, fraud detection firms, etc.

Figure 5:
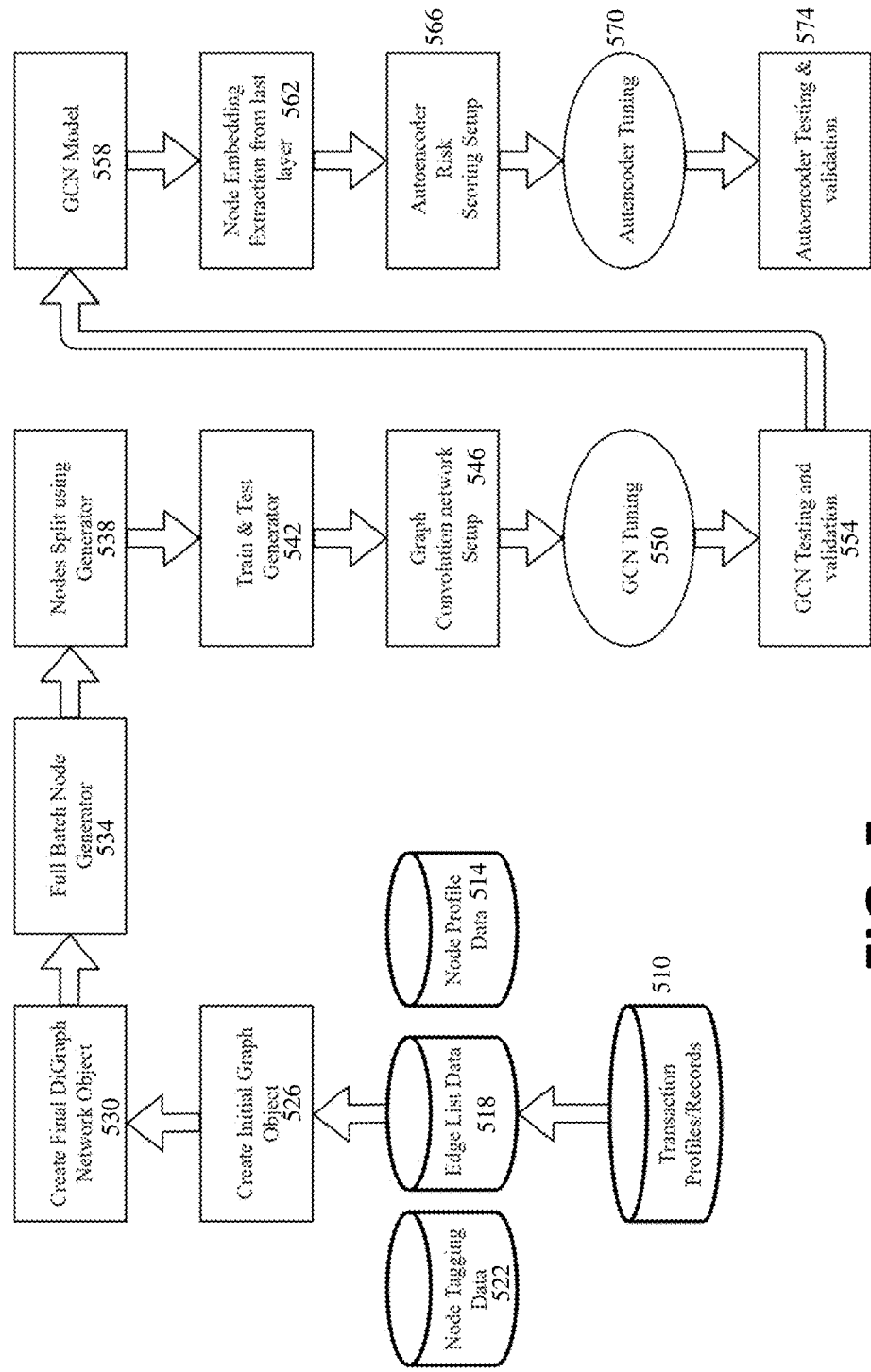

FIG. 5 illustrates a flowchart for some embodiment of the present disclosure. In this flowchart:

Transaction and Profile Records 510 in FIG. 5:

This data source (in DB 40) contains the monetary or any kind of transactions between the entities in a network. Transactions done between the entities can have multiple attributes describing type of transaction, channel used, monetary attributes etc. A single entity can perform multiple transactions. For each entity, transactions 140 are stored for a certain period, such as one month or two months. This historical information makes the profile significant and should help make the model better.

Entities can be of different kinds such as a single person account, a corporate account etc. or even devices (desktop or laptop computers, phones, etc.), which can communicate with each other and form a network between them. Entities are identified by their types (see Table 1, item 1) and have some attributes or features which helps to categorize them. These attributes should be helpful in creating the profiles (aggregated data).

Generally, the data for transactions is stored as a relation between a source entity and a destination entity. One of the entities acts as source and another acts as destination, and this is where the direction of transactions matters. In some cases, a neural network is generated where the direction of a transaction does not matter much. Such networks are called as directionless networks.

Node Profile Data 514:

This is entity profile data, generated for each entity based on the entity's transaction history. These profiles are superset of features which are created by aggregating the transactional data of entities.

Transactional history should be mature enough in order to be considered for profile creation. Maturity of profiles can be decided based on the time period of transactions done by entities. In this example, one month is used as the time period for profile creation. Strong profiles also help in building a strong GCN model and provide more data for analysis by machine learning algorithms.

In case of directional network/graph, where the direction of transaction matters, entities can act as source as well as destination entities. While performing transactions, some entities may act only as a receiver (destination), others may act only as a sender (source), and still others may act as both. Such behavior of entities is significant in risk score assessment. Therefore, the profiles are created distinguishing these roles of entities; see e.g. TABLE 1, items 3A and 3B. Source profiles have the features created on the transactions done by the entity as sender. Destination profiles have the features created on the transactions done by the entity as receiver. Other features are created based on all the transactions done by entity.

There can be different types of channels used by entities to perform the transactions in the network. Entity behavior with respect to a particular transaction type or channel can also contribute to risk assessment. Features aggregating the transactions done for transaction channels used by the entity can be significant. These features are also created to represent the node profile. See for example TABLE 1, features 3C and 3D.

This represents the superset of node profiles features. Based on the experience of investigating the suspicious entities and their neighbors having a relationship with the suspicious entities, some key indicator related to suspicious entities can be added to the profile or can be removed from the profile. These profiles will be used by a machine learning model by comparing an entity profile with a neighbor's profile as well as with suspicious entities profiles. So, rich profiles with significant key features from perspective of risk help to assign better, more accurate risk scores.

Link Relationship (Edge List Data) 518:

This data relates to relationships between different entities, and describes the transactional behavior among the entities. In the graph, transactions done by entities are represented as an edge or link between the entities. A risky network of entities may be detected as a network of two entities which are more contributing to the particular transaction types or channels. These entities might be using specific channels a significant number of times to commit fraud. This is also a significant aspect for identifying the risk in the network.

Link relationship profiles representing the relationship between the entities are calculated on the transactions by aggregating the attributes of transactions. See e.g. TABLE 2, items 3. For example, two given entities can transact using three channels channel1, channel2 and channel3. Features representing the number of transactions done for each channel and the average amount transacted using each channel for the two entities are calculated. Other features, indicating mean amount, minimum amount, median amount are also created representing the transactional behavior of the two entities.

In some embodiments, a link relationship profile will not change based on the direction of the transaction. A network having directionless activity can have the same features as a directional network. Even the types of entities will not matter in creating the relationship profile.

This represents the superset of relationship profile features. Based on the experience of investigating the suspicious entities and neighbors related to them, some key indicator related to suspicious entities can be added to the relationship profile or can be removed from the profile.

A machine learning model uses this relationship data to compare it over neighborhood relationship data and tries to find suspicious or risky entities.

Node Tagging Data 522:

Based on the experience of investigating the suspicious entities and neighbors related to them, some entities in the network can be marked (tagged) as suspicious or clean. A suspicious entity tag would indicate the entity behavior is more prominent towards financial crime. Sometimes, there is not enough data to categorize an entity as clean (not suspicious) or suspicious. Such entities can be tagged separately. In this example, such entities are tagged as "Alien".

The tagging data is useful for training the GCN model. Based on the data provided for tagged entities, the GCN tries to classify all the entities correctly. The GCN uses the node profiles and link relationship profiles and tries to find embeddings that would provide training node classifications corresponding to the tags.

Initial Graph Object 526:

This operation takes the node and link relationship data (514, 518) and builds a computer object for the graph structure 410 in computer storage (memory 30).

Graph structures can be difficult to study in dimensional space. The initial graph object 526 helps in storing the graph structure built using relationship data. This object can accommodate both directionless or directional networks. This object stores the link relationship profile, which is later used by the machine learning model to study the network nature. Later, this object is used to map the network nodes with their features created in node profile data (TABLE 1).

Final DiGraph Network Object 530:

The previous graph object 526 is then mapped with node profiles or risk features that would help the machine learning model track the risky behavior of entities. DiGraph represents the directional graph which also stores the directions of transaction tracking the source and destination entity.

A main objective behind this object 530 is to study the full network programmatically. This object helps in studying the different node types, link types, direction of the relationship between nodes. This enables to store the whole information about the network in a single object. Network information includes node profile features (TABLE 1) along with link relationship profile features (TABLE 2). In the next phase, it helps to extract the required information.

Full Batch Node Generator 534:

This generator helps in feeding the graph data 530 to the GCN model 420 in the required format. The generator uses some of the proven mathematical techniques which helps in representing the graph structure in matrix form. The generator takes the DiGraph Network object 530 as input which is in turn combinations of edge list data represented by initial graph object 526 and node features and converts them into the Adjacency matrix and the Laplacian matrix.

The Adjacency matrix helps in representing the graph structure using the matrix. It stores the edge information and node information. It also enables to store numeric attributes, including aggregated attributes, as weights related to the nodes and edges of the network. The Graph Laplacian matrix helps in understanding the network structure better. It extracts many useful properties of graphs such as spanning trees etc. and puts those in matrix form which in turn helps in identifying the nodes.

These combined are fed to the GCN model which uses this information to convolute the network.

Nodes Split Using Generator 538:

Node profile data created from transactional profile is split into train, test data and validation nodes. Then it is used to split the full batch generator based on the nodes present in each of these splits. This train and validation split generators are used by GCN for modelling purpose. Split of the node data is done based on the tagged data using stratified sampling. Balance of fraud and non-fraud nodes is maintained in each train, test and validation generator.

Train and Test Generator 542:

The generator creates the separate Adjacency matrix and Laplacian matrix for these splits to represent the mini-networks for the testing purpose. The train nodes will have majority of the data as it is useful for the model to learn the network. The validation nodes are used by the model to test the accuracy and adjust the model parameters based on the validation accuracy. The test nodes represent the unseen mini-network with some suspicious entities. After achieving sufficient accuracy on the Train and Validation data, the GCN can be used to predict suspicious nodes in Test data.

GCN Setup (546), Tuning and Training (550):

The GCN takes train, test and validation data as input. The GCN performs training on the train data.

The GCN setup (546) defines the number of layers to be used in the model. Also, it determines the activation function to be used between the layers (in activation blocks 450).

A convolutional layer (450L.i, where i=1, 2, . . . ) creates a new set of aggregated features (Tables 1 and 2) based on the neighbor's features by aggregating the features. The layer considers different levels (orders) of neighbors. Indirect neighbors which represents the neighbors of a neighbor can be taken into account. This hidden information (i.e. for hidden layers) is calculated for each node, and represents the behavior of the node in that network.

A non-linear activation function can be used between each two layers. The function, when used, takes the output of one layer and provides the input to next layer. The activation function helps in learning the features generated in the previous layer(s). The activation function enables the GCN to learn the complex behavior of the network. There is a lot of information generated by each layer; the activation function studies this information by applying a non-linear transformation, which in turn helps to better classify the target. The number of layers to be used in the GCN is part of training and testing and would be decided based on the accuracy of the model: if the model provides inaccurate results, the number of layers can be increased, for example.

While training the GCN, the last layer of the GCN is the layer which helps in classification of these nodes. This layer uses the features which are generated from previous layers based on the activation functions. This last layer gives the prediction result based on the input data in order to facilitate classifying the nodes.

Once the GCN setup 546 is done, the train and validation generators (550) are provided to the GCN model for the training purpose. The GCN model tries to learn the train data and produces the accuracy on the validation data. Based on the accuracy on the validation data, the GCN parameters can be tuned to get good accuracy: if the model provides inaccurate results, the number of layers can be increased, for example.

GCN Model 558:

The GCN model produced from training and tuning gives good accuracy in classifying the suspicious nodes versus non-suspicious nodes. Based on the information generated by each layer and activation function, a good number of features have been generated which are able to classify the nodes. The tuned GCN model is the best representation of the graph information aligned to our objective of classifying the risky entities.

Node Embedding Extraction (562):

The graph has a structure which is not easily understandable and not easily accommodated by machine learning algorithms Node embeddings extract the network properties related to all nodes and represent those as node features. In technical terms, node embeddings are the transformation of property graphs into low dimensional features. Node embeddings features are generated for all the nodes present in the network. Instead of having the complex structure of a graph, these node embeddings features can be easily understood and processed by machine learning algorithms.

A tuned GCN model helps in extracting the node embeddings. Last layer of the tuned GCN model (e.g. a readout layer) can be removed and used to extract the embeddings from the model. These embedding are the best representation of the graph information aligned to our objective of classifying the risky entities.

Autoencoder Model/Risk Scoring (Autoencoder Risk Scoring Setup 566, Autoencoder Tuning 570, Autoencoder Testing and Validation 574):

Targeted activities, e.g. fraudulent or high-risk activities in financial domain, have anomalous characteristics compared to normal financial transactions. So, anomaly detection (autoencoder is one type) is a type of machine learning algorithm used to identify outlier activities in a set of similar-type financial data.

Node embeddings obtained from the GCN model can be used as input to the Autoencoder (430). The autoencoder helps in identifying the rare event occurrence by reconstructing the input data provided. The autoencoder has two components (not shown): encoder and decoder. The encoder takes the embedding as input and learns these features. The decoder tries to decode the features learned and tries to reconstruct the original node. In case of legitimate, non-fraudulent nodes, which have normal behavior, the autoencoder will be able to reconstruct these nodes to a large extent. In this case, the reconstruction error should be small. However, the risky nodes' behavior is unusual compared to other nodes, and the autoencoder will not be able to reconstruct such nodes easily. So the reconstruction error should be high.

This reconstruction error can be normalized and used as a risk score. A high risk score corresponds to risky nodes or entities that are relatively riskier than other lower risk nodes or entities.

Figure 6:
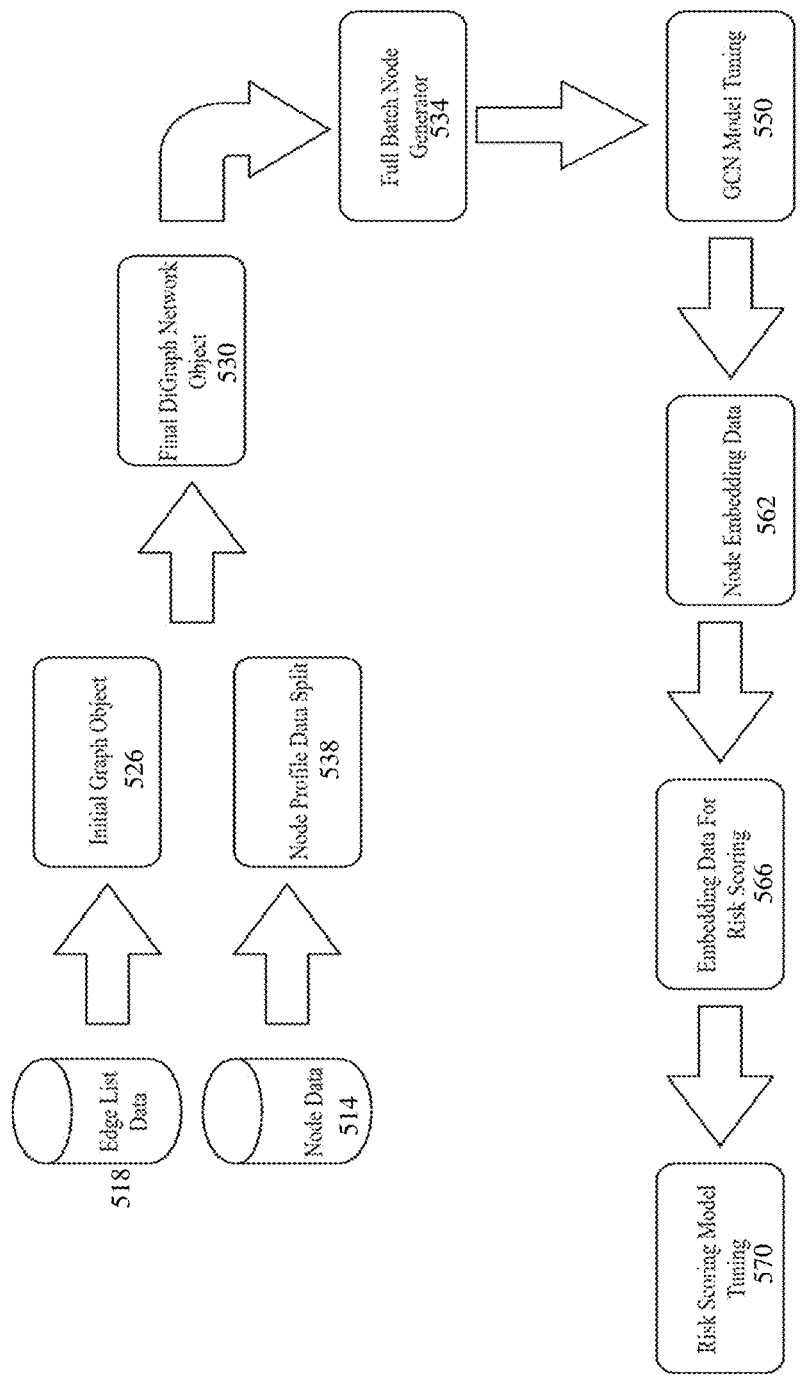

FIG. 6 illustrates another dataflow for some embodiments. In FIG. 6:

Node Data (Risk Features Data) 514:

This is entity profile data received from transaction and profile data source. The kind of features included (TABLES 1 and 2 for example) are selected mainly based on the experience from manual investigations. These can be termed as Risk Features as they help in identifying the risky entities.

The graph may include different types of nodes (e.g. accounts, persons, etc.), and the corresponding GCN is then called heterogeneous. If all the nodes are of the same time, the GCN is called homogeneous. Entities having same type may have the same set of risk features. Entities of different types may have different sets of risk features.

Edge List Data (Weighted)/Link Relationship (518):

This data pertains to relationships between different entities, describing the transactional behavior among the entities. This data helps in defining the network of entities based on transactions done by the entities. A single transaction between entities generates a relationship between the entities with specific attributes related to that transaction.

Edges represent the transaction attributes. There can be multiple transactions between two entities. In that case, aggregated features are generated based on the number of transactions. These features collectively help in identifying the nature of transactions done between the two entities.

The edge list data can be weighted or non-weighted. A weight can be the monetary amount of transactions or the number of transactions done or an aggregated value of the amount of transactions, etc., between the two entities.

Initial Graph Object 526:

This object takes the edge data 518 (link relationship features) and generates the object which represents the network between the entities. This graph object is used in a later phase to combine network details with risk features.

Node Profile Data Split 538:

The node profile data (514) is split into train, validation and test data sets. Machine learning models use this data to tune the model parameters by comparing accuracy on training and validation data. In some embodiments, the train data set contains 60% of the original nodes or entities; the validation and test data sets constitute to 20% each of the nodes. This data splitting helps in the modeling phase to validate the result.

Feature DiGraph Network Object (530):

This graph object combines the network information (graph generated using edge list data 518) and node profile information (risk features). This object parses the graph information provided.

This DiGraph object mainly deals with network directions. In some embodiments, most financial activities are directional. The DiGraph object helps in defining the source and destination entities. In other cases, a non-directional graph can be used to represent the network based on the use case.

Full Batch Node Generator 534:

Full batch node generator 534 takes the DiGraph object as input and represents the DiGraph object in the form of matrix. Full batch node generator 534 generates two matrices to describe all the network information and node profile or risk features. One matrix is called adjacency matrix which describes the network of entities, i.e. transactional relations between the entities. The other matrix is the Laplacian matrix which helps in finding the graph properties based on the provided data.

In a way, Node generator object 534 helps in formatting the network DiGraph information so that it can be consumed by the GCN machine learning model 420.

GCN Model Tuning 550:

The GCN performs a convolution on a graph to extract the most important information for nodes to classify each node. The GCN uses the embedding data generated as input for classifying the entities. These features are passed through multiple layers of propagation rules. This embedding is made more abstract from the perspective of the target as it passes through each layer. At the end of the last layer, the GCN generates the abstract node features embedding which are helpful in getting more accuracy considering the objective of classification.

The embeddings generated for the train and validation data are used by the GCN for tuning the model. The GCN model parameters are tuned based on the training on the train data and testing the results on the validation data. Finally, the test data is used to calculate the final accuracy of the model. The model result is tested using certain criteria like F1 score or AUC (Area Under the Curve). In this embodiment, the accuracy is measured by the F1 score. The F1 score is a standard model accuracy metric used in supervised classification problems. It is a harmonic means of precision and recall which in turn depends on the prediction result of the model.

Node Embedding Data 562:

An embedding is a closest representation of a graph in a low dimensional space while maintaining the geometry of the graph. In other terms, it is the transformation of properties possessed by the graphs to a vector or a set of vectors which can be used easily in a more practical sense.

These embeddings are calculated based on properties of graphs such as node neighborhood and different connections between the nodes. The GCN helps in converting the Adjacency matrix and Laplacian Matrix into node embeddings which are closest to the input network structure.

A graph can be a complex structure difficult to use without disturbing its geometry. Node embeddings helps in solving the problem.

Embedding Data for Risk Scoring (566):

Abstract node embedding data generated by the final layer of the GCN is used further for different objectives. In case of risk scoring in networks, this abstract node embedding can be used along with a classification machine learning model, e.g. an Autoencoder Neural Network 430.

Risk Scoring Model Training (570):

Autoencoder 430 takes the node embedding data target as input and provides the risk score in terms of reconstruction errors as output. As usual, fine tuning of the classification model as part of model training yields the risk scores with better accuracy.

In some embodiments, training a GCN model to determine the weights at each layer involves minimizing a predefined loss function computed on the GCN output embeddings. For example, in FIG. 4, the output of last layers 420L.3, 420L.C provides node classifications as suspicious or unsuspicious. The loss function determines, for the training data, how much the GCN outputs differ from the training tags. The training involves determining the weights that minimize the loss function.

Determining the weights may be computationally expensive. Known techniques can be used to reduce the computational complexity. For example, in some embodiments, some of the weights (denote them as weights W1) are initialized to random values, and the other weights (W2) are optimized to reduce the loss function. Then these optimized weights (W2) are fixed, and the weights W1 are optimized to reduce the loss function. Then the process can be repeated: W1 is held fixed at their new, optimized values, while W2 are optimized; and so on until the loss function is acceptably small or does not get reduced any longer.

To reduce computational complexity, training may be performed on sub-graphs, and the resulting weights for different sub-graphs can be aggregated to obtain final weights. Other techniques can also be used to split a graph training process into simpler processes. See for example the aforementioned Lu Bai reference, describing the Deep Graph Convolutional Neural Network (DGCNN) and Aligned-Spatial Graph Convolutional Network (ASGCN) models each of which can be used in some embodiments; see also the aforementioned "SEMI-SUPERVISED CLASSIFICATION WITH GRAPH CONVOLUTIONAL NETWORKS".

In a GCN, backpropagation can be used, i.e. the weights can be determined starting with the last convolutional layer (420L.3 in FIG. 4) and working back to the first convolutional layer. For example, in some embodiments, all the weights are initialized to random values. Then all the weights are held fixed except at the last convolutional layer (420L.3). The last convolutional layer weights are varied from their initial (random) values to reduce the loss function. A gradient descent method or some other technique can be used. After the last convolutional layer weights have been optimized in this manner, they are held fixed, and the preceding convolutional layer weights (420L.2) are varied to reduce the loss function. All the other convolutional layer weights are fixed. This process propagates backward to the first convolutional layer (420L.1), until all the weights have been optimized.

Some examples are described immediately below in more detail. These examples involve 10342 entities.

Background on Data:

Financial institute such as banks have accounts related to persons. These accounts can be of different types such current accounts, saving accounts or loan accounts etc. These are individual accounts, each of which is associated with a single user. These accounts may be referred to as Entities.

A financial institute might have multiple linked accounts of entity, e.g. for relatives of an individual, or for related entities of an organization (e.g. parent or subsidiary companies). Computer system 10 may create an entity to represent a collection of related accounts.

These entities transact between each other and send some amount of money via different channels. These channels can be Online banking, phone banking, Check, etc. In such a transaction, one entity which transfers the amount acts as Source Entity while the entity which receives the amount acts as Destination Entity.

Entities which are involved in money laundering are relatively higher risk than other entities, and are "suspicious". Suspicious entities are generally marked and maintained throughout their life in this category based on the past detection of money laundering activity.

These suspicious entities often send money to other entities that are close to them or have repeated transactions, or both. So, entities which are neighboring to a suspicious entity come under additional scrutiny and need to be investigated for money laundering.

Entities can perform different types of transactions such as wire transfer, online banking transactions such as ACH, bill payment, account deposits, etc. Transaction type acts as an attribute to a transaction between entities.

Sometimes, entities send money to a third party account which is alien for (or unknown to) the financial institution. In such transactions, source entity information would be available, but the destination entity information may be limited, e.g. just an account number or a person's name Such destination entities are referred to herein as Alien entities.

These alien entities can be a marker of suspicious entities as well. Again, alien entities can be marked as suspicious based on the past exercise of detecting money laundering.

So, we have entities which could act as source and destination and can be clean, suspicious, or alien. These entities send money to some other entities and to form network of transaction. Even, these transactions will have different attributes which can be considered.

In the references example implementation, transactions data by entities in one month is available. There are around 10342 entities available out of which 820 entities are having suspicious transactions. Entities with suspicious activities are considered as True Positives (TP) while the rest of the entities are treated as being clean at that time based on inputs described herein.

Details of transactions done by the entities are available. In the example, there are 26267 different types of transactions available along with other details such as amount, transaction type etc.

Data Preparation:

Node Data:

Each entity is represented as a node in the graph. An entity can be a single account owned by an individual or an account owned by a group of individuals or maybe corporate accounts. An entity can be of any one of different types and can have different attributes based on the type. This affects the network structure as well. A network or graph structure needs to consider the heterogeneous graphs which can be identified by these entity types.

In the example, only a single type of entity is considered. So the set of features or node attributes representing the entity are the same for all nodes.

An entity can act as a source or destination entity in different transactions. An entity as a source can send data to multiple entities. It can deal with specific channels to do the transaction.

Similarly, an entity as a destination can receive data from multiple entities via different channels. It can deal with different types of transactions.

In this way, an entity may have one profile for acting as a source, and a different profile for acting as a destination. The tracked and aggregated attributes of a transaction source may differ from the tracked and aggregated attributes of a transaction destination. This can be important for financial crime detection.

Source and destination profiles keep track of different channels used by the entity to transfer and receive the data. Also, features such as min, max, median, etc. amount sent or received by the entity when acting as source or destination makes the profile more reliable and accurate.

In the example, 17 features (attributes) each for source and destination based on the transaction types are generated to capture this behavior. In other cases, it can be features, as optimized during the earlier stages.

Features which keep the count of all transactions done for a channel regardless of the role of entity as source or destination also help to improve the profile.

Along with the number of transactions done, some features can keep track of min, max, median etc. amount transacted by the entity for a period of time. This is again regardless of the entity role as source or destination entity.

In the example, 32 such features are created to contribute to node profile. In other cases, it can be features, as optimized during the earlier stages.

Basic idea behind such feature creation is, every entity has neighbors and GCN helps in tracking neighbors' behavior based on such features. These features in the end help in detecting suspicious behavior of a particular entity.

Target data representing whether the entity is suspicious or clean is provided with the node data. This target label (tag) helps marking the suspicious entities in the network and gives them special attention while training the model. Marking the entity as clean or suspicious again depends on past knowledge of financial institutions.

In summary, the example had 66 features used for 10342 entities as node profiles. Out of all these entities, 820 entities are marked as suspicious represented by "TP" (i.e. "True Positives" in the context of fraud) while the rest of the entities are marked as clean.

This data is used to generate the Adjacency Matrix which represents network details while representing the graph structure in matrix format. Then it is fed to the GCN.

A snapshot of sampled data with subset of columns is illustrated in FIG. 7. The abbreviation "TP" in the last column means "True Positive". "TRX" means "Transaction".

Edge Data:

Transactions done between entities are represented as an edge in the network. There could be multiple transactions between entities.

These transactions can be related to different channels, transaction types etc. Based on transaction properties or attributes, some features can be created to signify the importance of the type of transaction done by suspicious entities compared with clean entities.

Single entity can transact with many entities. At least one transaction between entities can signify their relationship. If there are multiple transactions done between entities, features are created by aggregating the transaction attributes at source and entity level. In this way, aggregated features are created for edges.

Transaction details are used as Edge Attributes (see TABLE 2 for example) to feed the GCN with network details.

In the example, only two features are found to matter, frequency of transactions between entities along with total amount for each transaction. In other situations, additional features will be used. FIG. 8 illustrates a snapshot of example data.

GCN Model Training and Results:

Node data is stratified split for training to have 60% nodes. Test and validation have around 20% each node data which is used for model validation purpose.

Node features and targets data is provided to create the network. A graph object is required to map the node features and nodes. So, network object along with node features created the final graph object.

To feed data from the graph to the learning model, a generator is used. Since GCN is a full-batch model, Node Generator is used to feed node features and the normalized graph Laplacian matrix to the model. Node generator is a program which maps the network structure of the graph to input required by the GCN.

Normalized graph Laplacian matrix helps in understanding the network structure better. It extracts many useful properties of graphs such as spanning trees etc. and puts those in matrix form which in turn helps in identifying the entities.

Node Generator is used to generate the adjacency matrix and supply the normalized graph Laplacian matrix to the model. In this example, we have used separate node generator for train and validation data as both will have the specific features which would be used while training the model.

A GCN model is created with rectified linear activation and layers. A different activation function for each layer can be used.

In this example, 5 layers are considered, and a linear activation function used for all layers.

Predictions are done using softmax activation which is added at the end of all layers. Multiple epochs are used to train the model. Epochs represents the number of cycles used by the algorithm to train on the data provided. Generally, it gives a chance to GCN to study the previous behavior of the model and adjust accordingly to adjust the model parameters and give the better result in each cycle.

The GCN model is trained on the input and output node embeddings for node prediction keeping track of accuracy on the training set, and its generalized performance on the validation set.

Figure 9:
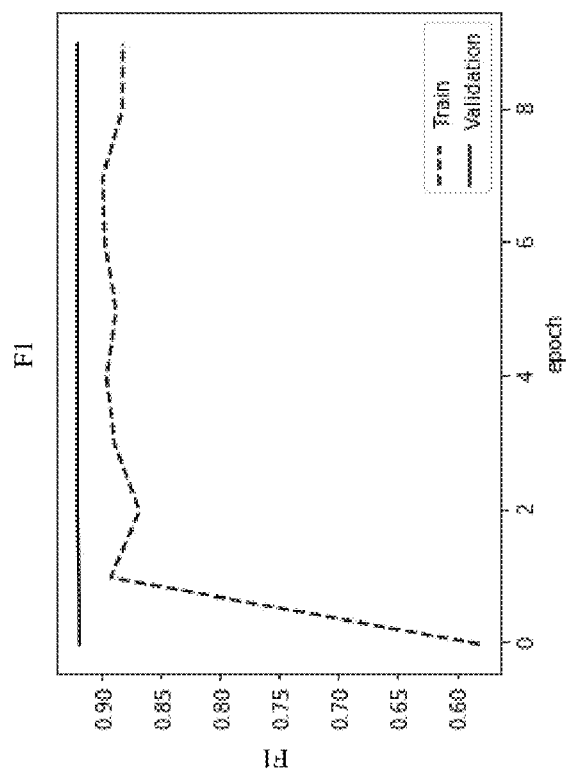

For given example, FIG. 9 shows the accuracy on train and validation for each epoch. There are 10 epochs used in the given example. In other cases, it can be adjusted or optimized based on the performance.

F1 is a standard performance measure used in the industry for multiple supervised learning problems. It is the harmonic mean of the precision and recall which are in turn calculated based on the model prediction result. It ranges from 0 to 1, close to 1 termed as best while close to 0 as worst.

Once the model is trained, we test the accuracy on Test data using the trained model. Accuracy on test data set is as follows:

Test Set Metrics:
Loss: 1.2789
Acc: 0.9207
F1: 0.9207

On the test set, it provided us 0.9207 F1 score.

A new model is created using the same inputs of the GCN model input tensors as used previously. The same trained weights are kept for the new model. The new model gives the node embeddings as output.

These node embeddings are generated at each layer of the model based on the trained GCN model. FIG. 10 shows a snapshot of node embeddings.

These node embeddings are used to represent properties of the nodes extracted from the graph. Embeddings are generated for each node and can be used for any kind of graph based supervised or unsupervised problem.

Risk Scoring Model Training and Results:

In the context of risk scoring, the node embeddings are fed to any supervised classification model to get the risk score for each entity. In this example, the node embeddings are fed to Autoencoder Neural Network machine learning algorithm along with target labels (tags).

The node embeddings data are fed with labels for each node. The autoencoder will try to reconstruct the embeddings for each entity and gives the reconstruction error. This reconstruction error can be normalized and used as risk score. The higher the reconstruction error, the higher is the risk score to indicate the more suspicious entity.

Figure 12:
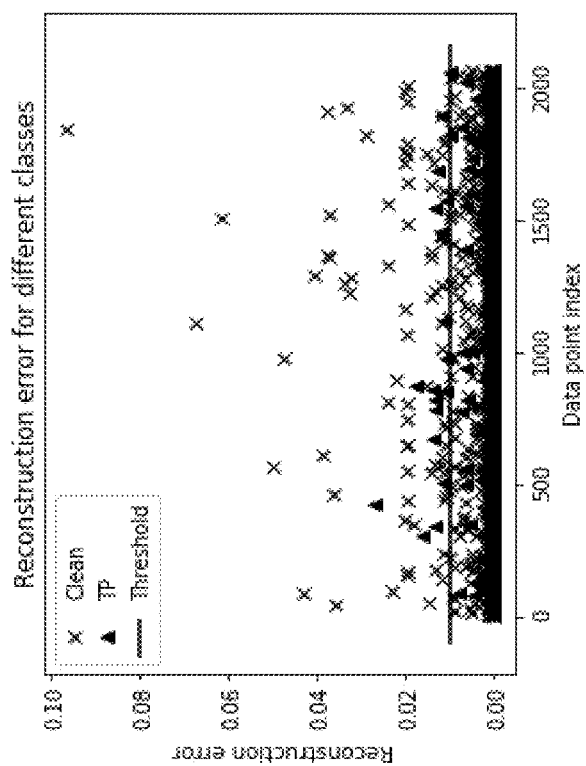

FIG. 11 illustrates the risk scores obtained in this example. FIG. 12 shows the reconstruction errors. The risk score and reconstruction error are plotted for each entity. Visually we can see that some of the entities are higher risk and are therefore more suspicious. These can be investigated with high priority.

Figure 13:
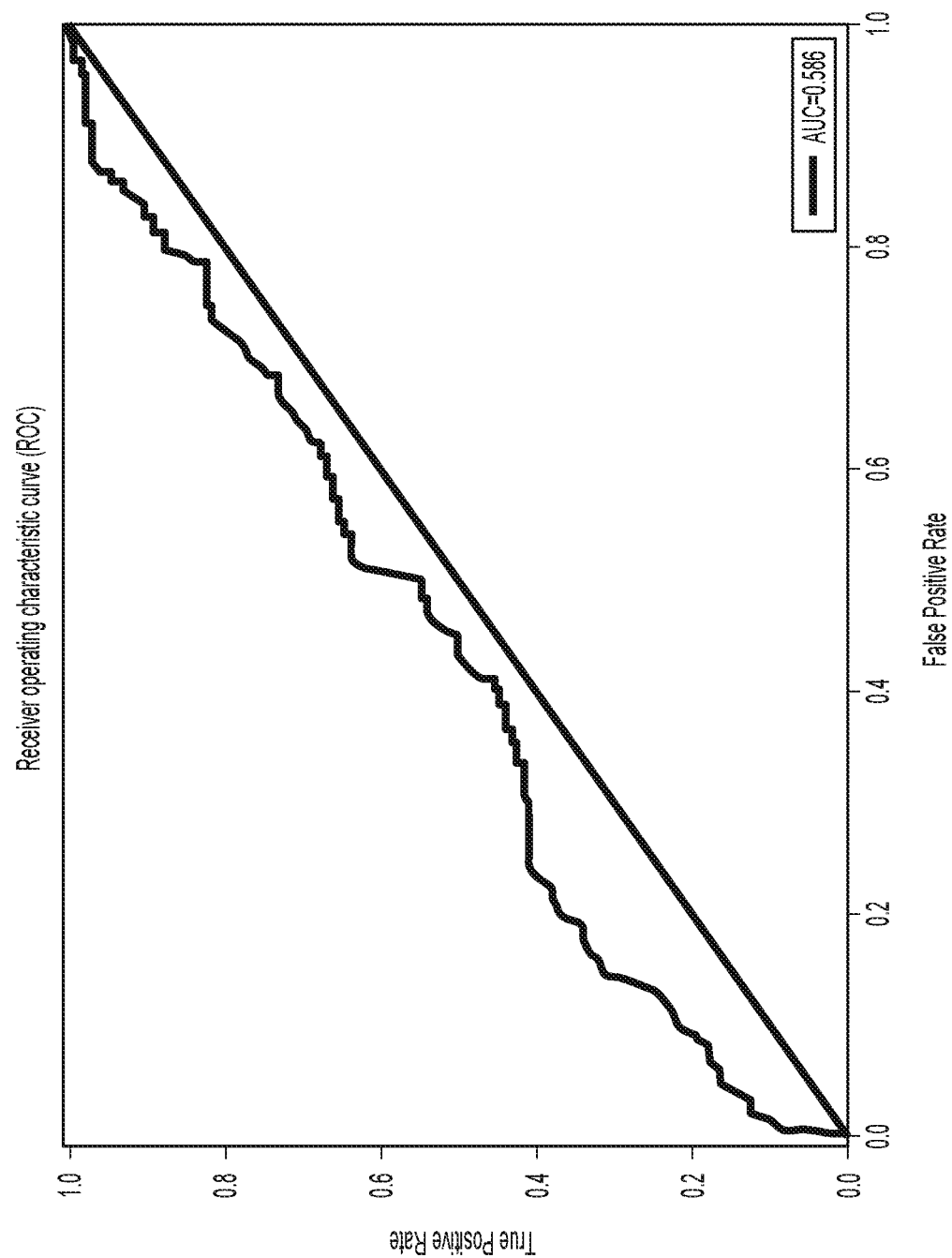

FIG. 13 shows an ROC (Receiver Operating Characteristic) curve and the performance is measured in terms of AUC (Area Under Curve). AUC is 0.586 in the figure and the model is showing good measure for separating suspicious entities from non-suspicious entities in this embodiment.

Exemplary Graph Convolutional Networks:

Graph Convolutional Networks and their variants are a way to approach graph calculations. GCNs are built upon multi-layer neural networks. Graph Convolutional Networks are an efficient variant of Convolutional Neural Networks on graphs.

A graph in computer science is a data structure consisting of Vertices (also called nodes, e.g. 410N) and Edges (also called links or connections, e.g. 410E). Graphs can be used to model real-world phenomena like social networks, molecular structures, semantic structures, geographical or financial transactions.

A graph can be directed or undirected.

A Graph Convolutional Network (GCN) performs a convolution on a graph to extract the most important information for nodes to classify the nodes. The GCN passes a filter over the graph, looking for essential vertices and edges that can help classify the nodes. See for example, the aforementioned article by Thomas Kipf, "GRAPH CONVOLUTION NETWORKS", https://tkipf.github.io/graph-convolutional-networks/.

For the GCN model, the goal is then to learn a function of signals/features on a graph G=(V,E). The GCN input includes the set of vertices V (410N) and edges E (410E); a feature description for every node (for example, if the nodes are labeled by some index i, the corresponding feature description is a vector, denoted for example $x_i$, of some dimension D which is the number of features, so the features for all nodes can be represented as a N×D feature matrix X where N is the number of nodes); and a representative description of the graph structure in matrix form, typically in the form of an adjacency matrix A. In some embodiments, X also includes edge attributes. The GCN model produces a node-level output Z which is an N×F feature matrix, where F is the number of output features per node. In many embodiments, F is smaller than D. Graph level outputs can be modeled by introducing a pooling function. So, a neural network layer, such as a combination of a convolutional layer 420L.l and activation 450.l (l=1, 2, 3 in FIG. 4) can act as a non-linear function as below:

$$H^{(l+1)} = f(H^{(l)}, A) \quad (1)$$

where $H^{(l)}$ is the feature matrix output by layer l; $H^{(0)}=X$; and $H^{(L)}=Z$ (or z for graph-level outputs); L is the number of layers in the network. An exemplary form of a layer-wise propagation rule is:

$$f(H^{(l)}, A) = \sigma(A H^{(l)} W^{(l)}) \quad (2)$$

where $W^{(l)}$ is a weight matrix for the l-th neural network layer, and $\sigma(\bullet)$ is a non-linear activation function (e.g. ReLU or some other activation function).

In some examples, the adjacency matrix A is weighted, and the weight may depend on the corresponding edge's attributes. In some embodiments, the matrices $H^{(l)}$ incorporate edge features. Also, the adjacency matrix can be replaced by the sum of the adjacency matrix and the identity matrix. Further, symmetric normalization can be used. For example, the propagation rule can be:

$$f(H^{(l)}, A) = \sigma\left(\hat{D}^{-\frac{1}{2}} \hat{A} \hat{D}^{-\frac{1}{2}} H^{(l)} W^{(l)}\right) \quad (3)$$

where $\hat{A}=A+I$ where I is the identity matrix and $\hat{D}$ is the diagonal node degree matrix of $\hat{A}$.

Let us denote a node i as $v_i \in G$, and let $h_{v_i}^{(l)}$ denote the vector of the features of $v_i$. Then the Graph Convolutional layer-wise propagation rule can be written in vector form as:

$$h_{v_i}^{(l+1)} = \sigma\left(\sum_j \frac{1}{c_{ij}} h_{v_j}^{(l)} W^{(l)}\right) \quad (4)$$

where j indexes the neighboring nodes of $v_i$, and $c_{ij}$ is a standardization constant for the link $(v_i, v_j)$ which provides for the evenly standardized adjacency matrix $$D^{-\frac{1}{2}} A D^{-\frac{1}{2}}$$

in GCN model.

Other suitable propagation rules are described in the aforementioned Lu Bai reference, including Deep Graph Convolutional Neural Network (DGCNN) and Aligned-Spatial Graph Convolutional Network (ASGCN) models.

In some embodiments, the graph G is a financial network, V are entity nodes, and E are the edge relationships. The above function (4) in vector form is the inferred risk score as output for the entity $v_i$ in focus. Further, $h_{v_j}^{(l)}$ are neighborhood entity properties for the concerned entity, where j is the index of the neighbor, i is the index of entity, and $h_{v_i}^{(l+1)}$ is the output risk score, or weighted output based on its neighborhood properties like past node's information patterns used during model training.

The invention is not limited to the examples described above. Some embodiments are defined by the following clauses.

Clause 1 defines a method for detecting unauthorized or suspicious financial activity, the method comprising:

obtaining first data by a computer system comprising one or more computer processors and a computer storage, wherein the first data comprise information on entities and financial transactions, wherein each entity is at least one of:

one or more accounts in a financial institution;

one or more companies;

one or more human beings;
one or more complete or partial addresses;
one or more devices operable to communicate over a computer network;

(2) processing the first data by the computer system to obtain a graph representation of the first data in the computer storage, the graph comprising nodes and edges, wherein:
each node represents an entity;
each edge represents a relationship between two or more entities, the relationship being at least one of:
the two or more entities having participated in each of at least one financial transaction;
one or more of the two or more entities having an ownership interest in the other one or more of the two or more entities;
the two or more entities being business affiliates;
the two or more entities having a personal relationship;
the two or more entities having a family relationship;
wherein the nodes comprise a plurality of the nodes associated with one or more first attributes each of which is associated with a period of time and represents aggregated information on one or more financial transactions performed in the associated period of time and involving, for each node, the entity represented by the node;
wherein the edges comprise a plurality of the edges associated with one or more second attributes each of which is associated with a period of time and represents aggregated information on one or more financial transactions performed in the associated period of time and involving, for each edge, the entities whose relationship is represented by the edge;
(3) wherein the method further comprises processing the graph representation by the computer system to detect the unauthorized or suspicious financial activity.

2. The method of clause 1, wherein operation (3) comprises training the computer system using one or more neural networks using the first data as training data, the one or more neural networks including a graph convolutional neural network processing the graph representation and providing one or more node embedding outputs which depend on values of the first and second attributes.

3. The method of clause 1 or 2, further comprising using one or more of the node embedding outputs to classify each node as suspicious or unsuspicious, wherein the one or more node embedding outputs for each node include a risk score used to classify the node as suspicious or unsuspicious and indicating a risk that the corresponding entity is involved in an unauthorized financial activity.

4. The method of any preceding clause, wherein operation (3) comprises processing the graph representation by a graph convolutional neural network which has been trained.

5. The method of any preceding clause, wherein the unauthorized financial activity comprises money laundering and/or fraudulent activity and/or high-risk activity.

6. The method of any preceding clause, wherein at least one first attribute represents, for each node, aggregated information on all financial transactions in which the corresponding entity was a sender in the associated period of time, and at least one first attribute represents, for each node, aggregated information on all financial transactions in which the corresponding entity was a receiver in the associated period of time.

7. The method of any preceding clause, wherein at least one first attribute represents, for each node, aggregated information on all financial transactions performed in the associated period of time, including the financial transactions in which the corresponding entity was a sender and the financial transactions in which the corresponding entity was a receiver.

8. The method of any preceding clause, wherein at least one first attribute is associated with a transaction channel and/or a transaction type, and represents, for each node, aggregated information on all the financial transactions involving the corresponding entity and (i) performed over the associated channel and/or (ii) having the associated transaction type.

9. The method of any preceding clause, wherein at least one second attribute represents, for each edge, a frequency of transactions between entities interconnected by the edge.

10. The method of any preceding clause, wherein at least one second attribute is associated with a transaction channel and represents, for each edge, aggregated information on all the financial transactions performed over the channel.

11. The method of any preceding clause, wherein the edges comprise weighted directed edges each of which leads from one or more nodes representing a transaction sender to one or more nodes representing a transaction receiver; and
wherein at least one second attribute for the directed edges represents aggregated information on all financial transactions from the transaction sender to the transaction receiver.

12. The method of any preceding clause, wherein at least one node represents one or more accounts, and at least one other node represents an entity which is not one or more accounts.

The invention also includes computer systems configured to perform the methods described herein, and computer readable media comprising computer instructions executable by computer systems' processors to perform the methods described herein.

Although illustrative embodiments have been shown and described, a wide range of modifications, changes and substitutions are contemplated in the foregoing disclosure and in some instances, some features of the embodiments may be employed without a corresponding use of other features. One of ordinary skill in the art would recognize many variations, alternatives, and modifications of the foregoing disclosure. Thus, the scope of the present application should be limited only by the following claims, and it is appropriate that the claims be construed broadly and in a manner consistent with the scope of the embodiments disclosed herein.

What is claimed is:

1. A method for detecting unauthorized or suspicious financial activity, the method comprising:
(1) obtaining first data by a computer system comprising one or more computer processors and a computer storage, wherein the first data comprise information on entities and financial transactions, wherein each entity is at least one of:
one or more accounts in a financial institution;
one or more companies;
one or more human beings;
one or more complete or partial addresses;
one or more devices operable to communicate over a computer network;
(2) processing the first data by the computer system to obtain a graph representation of the first data in the computer storage, the graph comprising nodes and edges, wherein:
(a) each node represents an entity;
(b) each edge represents a relationship between two or more entities, the relationship being at least one of:

the two or more entities having participated in each of at least one financial transaction;

one or more of the two or more entities having an ownership interest in the other one or more of the two or more entities;

the two or more entities being business affiliates;

the two or more entities having a personal relationship;

the two or more entities having a family relationship;

wherein the nodes comprise a plurality of the nodes associated with one or more first attributes each of which is associated with a period of time and represents aggregated information on one or more financial transactions performed in the associated period of time and involving, for each node, the entity represented by the node;

wherein the edges comprise a plurality of the edges associated with one or more second attributes each of which is associated with a period of time and represents aggregated information on one or more financial transactions performed in the associated period of time and involving, for each edge, the entities whose relationship is represented by the edge;

(3) wherein the method further comprises processing the graph representation by the computer system to detect the unauthorized or suspicious financial activity.

2. The method of claim 1, wherein operation (3) comprises training the computer system using one or more neural networks using the first data as training data, the one or more neural networks including a graph convolutional neural network processing the graph representation and providing one or more node embedding outputs which depend on values of the first and second attributes.

3. The method of claim 2, further comprising using one or more of the node embedding outputs to classify each node as suspicious or unsuspicious, wherein the one or more node embedding outputs for each node include a risk score used to classify the node as suspicious or unsuspicious and indicating a risk that the corresponding entity is involved in an unauthorized financial activity.

4. The method of claim 1, wherein operation (3) comprises processing the graph representation by a graph convolutional neural network which has been trained.

5. The method of claim 1, wherein the unauthorized financial activity comprises money laundering and/or fraudulent activity and/or high-risk activity.

6. The method of claim 1, wherein at least one first attribute represents, for each node, aggregated information on all financial transactions in which the corresponding entity was a sender in the associated period of time, and at least one first attribute represents, for each node, aggregated information on all financial transactions in which the corresponding entity was a receiver in the associated period of time.

7. The method of claim 1, wherein at least one first attribute represents, for each node, aggregated information on all financial transactions performed in the associated period of time, including the financial transactions in which the corresponding entity was a sender and the financial transactions in which the corresponding entity was a receiver.

8. The method of claim 1, wherein at least one first attribute is associated with a transaction channel and/or a transaction type, and represents, for each node, aggregated information on all the financial transactions involving the corresponding entity and (i) performed over the associated channel and/or (ii) having the associated transaction type.

9. The method of claim 1, wherein at least one second attribute represents, for each edge, a frequency of transactions between entities interconnected by the edge.

10. The method of claim 1, wherein at least one second attribute is associated with a transaction channel and represents, for each edge, aggregated information on all the financial transactions performed over the channel.

11. The method of claim 1, wherein the edges comprise weighted directed edges each of which leads from one or more nodes representing a transaction sender to one or more nodes representing a transaction receiver; and wherein at least one second attribute for the directed edges represents aggregated information on all financial transactions from the transaction sender to the transaction receiver.

12. The method of claim 1 wherein at least one node represents one or more accounts, and at least one other node represents an entity which is not one or more accounts.

13. A computer system comprising one or more processors and computer storage that are configured to perform a method for detecting unauthorized or suspicious financial activity, the method comprising:

(1) obtaining first data, wherein the first data comprise information on entities and financial transactions, wherein each entity is at least one of:

one or more accounts in a financial institution;

one or more companies;

one or more human beings;

one or more complete or partial addresses;

one or more devices operable to communicate over a computer network;

(2) processing the first data to obtain a graph representation of the first data in the computer storage, the graph comprising nodes and edges, wherein:

(a) each node represents an entity;

(b) each edge represents a relationship between two or more entities, the relationship being at least one of:

the two or more entities having participated in each of at least one financial transaction;

one or more of the two or more entities having an ownership interest in the other one or more of the two or more entities;

the two or more entities being business affiliates;

the two or more entities having a personal relationship;

the two or more entities having a family relationship;

wherein the nodes comprise a plurality of the nodes associated with one or more first attributes each of which is associated with a period of time and represents aggregated information on one or more financial transactions performed in the associated period of time and involving, for each node, the entity represented by the node;

wherein the edges comprise a plurality of the edges associated with one or more second attributes each of which is associated with a period of time and represents aggregated information on one or more financial transactions performed in the associated period of time and involving, for each edge, the entities whose relationship is represented by the edge;

(3) wherein the method further comprises processing the graph representation by the computer system to detect the unauthorized or suspicious financial activity.

14. The computer system of claim 13, wherein operation (3) comprises training the computer system using one or more neural networks using the first data as training data, the one or more neural networks including a graph convolutional neural network processing the graph representation and providing one or more node embedding outputs which depend on values of the first and second attributes.

15. The computer system of claim 13, further comprising using one or more of the node embedding outputs to classify each node as suspicious or unsuspicious, wherein the one or more node embedding outputs for each node include a risk score used to classify the node as suspicious or unsuspicious and indicating a risk that the corresponding entity is involved in an unauthorized financial activity.

16. The computer system of claim 13, wherein operation (3) comprises processing the graph representation by a graph convolutional neural network which has been trained.

17. The computer system of claim 13, wherein the unauthorized financial activity comprises money laundering and/or fraudulent activity and/or high-risk activity.

18. The computer system of claim 13, wherein at least one first attribute represents, for each node, aggregated information on all financial transactions in which the corresponding entity was a sender in the associated period of time, and at least one first attribute represents, for each node, aggregated information on all financial transactions in which the corresponding entity was a receiver in the associated period of time.

19. The computer system of claim 13, wherein at least one first attribute represents, for each node, aggregated information on all financial transactions performed in the associated period of time, including the financial transactions in which the corresponding entity was a sender and the financial transactions in which the corresponding entity was a receiver.

20. The computer system of claim 13, wherein at least one first attribute is associated with a transaction channel and/or a transaction type, and represents, for each node, aggregated information on all the financial transactions involving the corresponding entity and (i) performed over the associated channel and/or (ii) having the associated transaction type.

* * * * *